(12) United States Patent
Kim et al.

(10) Patent No.: US 10,189,984 B2
(45) Date of Patent: Jan. 29, 2019

(54) THERMOPLASTIC RESIN COMPOSITION AND MOLDED ARTICLE

(71) Applicant: LG CHEM, LTD., Seoul (KR)

(72) Inventors: Seo Hwa Kim, Daejeon (KR); Seong Lyong Kim, Daejeon (KR); Tae Hoon Kim, Daejeon (KR); Ju Hyeong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 66 days.

(21) Appl. No.: 15/542,847

(22) PCT Filed: Nov. 30, 2016

(86) PCT No.: PCT/KR2016/013917
§ 371 (c)(1),
(2) Date: Jul. 11, 2017

(87) PCT Pub. No.: WO2017/099410
PCT Pub. Date: Jun. 15, 2017

(65) Prior Publication Data
US 2018/0002522 A1 Jan. 4, 2018

(30) Foreign Application Priority Data
Dec. 10, 2015 (KR) ........................ 10-2015-0175538

(51) Int. Cl.
| | |
|---|---|
| *C08L 33/20* | (2006.01) |
| *C08J 5/18* | (2006.01) |
| *C08L 25/12* | (2006.01) |
| *C08L 51/06* | (2006.01) |
| *C08L 67/02* | (2006.01) |
| *C08L 75/04* | (2006.01) |
| *F25D 23/08* | (2006.01) |
| *C08L 51/04* | (2006.01) |

(52) U.S. Cl.
CPC ................ *C08L 33/20* (2013.01); *C08J 5/18* (2013.01); *C08L 25/12* (2013.01); *C08L 51/04* (2013.01); *C08L 51/06* (2013.01); *C08L 67/02* (2013.01); *C08L 75/04* (2013.01); *F25D 23/08* (2013.01); *C08J 2325/12* (2013.01); *C08J 2333/20* (2013.01); *C08J 2451/00* (2013.01); *C08J 2451/04* (2013.01); *C08J 2451/06* (2013.01); *C08J 2467/02* (2013.01); *C08L 2205/035* (2013.01)

(58) Field of Classification Search
CPC .......... C08L 75/04; C08L 25/12; C08L 51/06; C08L 67/02; C08L 33/20; C08L 2205/035; F25D 23/08; C08J 5/18; C08J 2467/02; C08J 2451/06; C08J 2451/00; C08J 2333/20; C08J 2325/12; C08J 2451/04
See application file for complete search history.

(56) References Cited

U.S. PATENT DOCUMENTS

| | | | | |
|---|---|---|---|---|
| 2001/0051688 A1* | 12/2001 | Kurata et al. | ......... | C08F 279/02 525/243 |
| 2012/0220677 A1 | 8/2012 | Williams et al. | | |
| 2015/0368460 A1* | 12/2015 | Sohn et al. | ............. | C08L 67/02 524/504 |

FOREIGN PATENT DOCUMENTS

| | | |
|---|---|---|
| EP | 1148095 A1 | 10/2001 |
| JP | H09-303950 A | 11/1997 |
| JP | 11-293085 A | 10/1999 |
| KR | 10-0232625 B1 | 12/1999 |
| KR | 10-2000-0014170 A | 3/2000 |
| KR | 10-2006-0076161 A | 7/2006 |
| KR | 10-2013-0075793 A | 7/2013 |
| KR | 10-2014-0099609 A | 8/2014 |
| KR | 10-2015-0045160 A | 4/2015 |
| KR | 10-1506370 B1 | 4/2015 |
| WO | 2006/003972 A1 | 1/2006 |
| WO | 2014/098122 A1 | 6/2014 |

OTHER PUBLICATIONS

"Arkema reveals new low-GWP blowing agent for polyurethane foams", Additives for Polymers, Nov. 2013, pp. 3, vol. 2013, No. 11.
"Horiba Scientific, A Guidebook to Particle Size Analysis", Jan. 1, 2012, pp. 1-32, Horiba Instruments Inc.
Extended European Search Report for EP Application No. 16873275. 8, dated Oct. 10, 2018.
Ruey-Shi Tsai et al., "Effect of Thermal History on Properties of block-Copolyetheresters with Poly(tetramethylene 2,6-naphthalenedicarboxylate) Segements", Journal of Applied Polymer Science, Jan. 1, 1999, pp. 1441-1449, vol. 73, John Wiley & Sons, Inc.
International Search Report for International Patent Application No. PCT/KR2016/013917 filed on Nov. 30, 2016.

\* cited by examiner

*Primary Examiner* — Nathan M Nutter

(57) ABSTRACT

The present invention relates to a thermoplastic resin composition and a molded article manufactured thereofrom. In accordance with the present invention, a thermoplastic resin composition providing higher chemical resistance with respect to a blowing agent while providing the same impact strength, gloss, and vacuum moldability as existing resin compositions when used to produce an inner case of a refrigerator, and a molded article manufactured from the same are provided.

17 Claims, No Drawings

THERMOPLASTIC RESIN COMPOSITION AND MOLDED ARTICLE

CROSS-REFERENCE TO RELATED APPLICATION

This application is a U.S. National Stage of International Patent Application No. PCT/KR2016/013917, filed Nov. 30, 2016, claims the priority benefit of Korean Patent Application No. 10-2015-0175538, filed on Dec. 10, 2015 in the Korean Intellectual Property Office, the disclosure of which is incorporated herein by reference.

TECHNICAL FIELD

The present invention relates to a thermoplastic resin composition and a molded article manufactured therefrom. More particularly, the present invention relates to a thermoplastic resin composition for an inner case of a refrigerator which provides higher chemical resistance to a blowing agent while providing impact strength, gloss, and vacuum moldability identical to those of existing resin compositions, and a molded article manufactured therefrom.

BACKGROUND ART

Conventionally, cyclofluorocarbons (CFC), such as CC13F (CFC-11), have been used as a standard blowing agent for preparation of hard and soft polyurethane and isocyanate-based foams. However, since release of the substances to the atmosphere causes damage of an ozone layer in the stratosphere, use thereof has been inhibited. Accordingly, hydrogen-containing chlorofluoroalkanes (HCFCs) having a relatively short lifetime in the atmosphere, such as $CHCl_2CF_3$ (HCFC-123) and $CH_2ClCHClF$ (HCFC-141b), have been suggested as alternative blowing agents. However, HCFCs, which partially contain chlorine, also have relatively high Global Warming Potential (GWP) and Ozone Depletion Potential (ODP).

Accordingly, non-chlorinated, partially hydrogenated fluorocarbons (HFCs) have been suggested as blowing agent substituents for HCFC compounds. However, since HCFs have problems such as relatively high intrinsic thermal conductivity, i.e., low insulation properties, HFC-based blowing agents having improved insulation properties, such as $CF_3CH_2CF_2H$ (HFC-245fa), have been suggested. However, HFC-based blowing agents, such as HFC-245fa and recently developed HFC-134a and HFC-365 mfc, also have a disadvantage in that global warming indexes thereof are higher than a desired global warming index.

In addition, although hydrocarbon blowing agents, such as iso- and n-pentane, or cyclopentane, exhibit a very low global warming index, hydrocarbon blowing agents have a low heat insulation efficiency compared to, for example, HFC-245fa, as a blowing agent, and have combustibility.

The aforementioned blowing agents are used when polyurethane is foamed to provide a urethane foam layer. A resultant polyurethane foam is used as an insulation material between an exterior steel plate and a molded inner resin which are refrigerator components.

As a material for the molded inner resin, an acrylonitrile-butadiene-styrene resin (hereinafter referred to as "ABS resin"), which has superior processability, moldability, impact resistance, strength, gloss, and the like and thus is widely applied to various electric and electronic parts and accessories, may be used. Such an acrylonitrile-butadiene-styrene resin should have superior chemical resistance, which is not deteriorated by the aforementioned blowing agents, to prevent defect occurrence such as crack generation during production processes and use of products.

Accordingly, to improve chemical resistance of an ABS resin, various methods, such as a method of increasing the content of acrylonitrile included in the ABS resin, a method of increasing the molecular weight of the resin, a method of increasing a butadiene rubber content, a method of using a product including a rubber with a large average diameter, and a method of using an acrylate-based rubber, have been attempted. However, it has been difficult to provide a thermoplastic resin composition for a refrigerator inner case having a stricter level of chemical resistance while maintaining the same impact strength, gloss, vacuum formability, and the like as an existing ABS resin due to the development of a foaming agent having new eco-friendly characteristics and improved foaming efficiency.

RELATED ART DOCUMENT

Patent Documents (Patent Document 1) KR 10-2000-0014170A
(Patent Document 2) KR 10-2006-0076161A

DISCLOSURE

Technical Problem

Therefore, the present invention has been made in view of the above problems, and it is one object of the present invention to provide a thermoplastic resin composition which provides higher chemical resistance with respect to a blowing agent, particularly a recently-developed eco-friendly blowing agent, while providing the same impact strength, gloss, and vacuum moldability as existing resin compositions when used to produce an inner case of a refrigerator.

It is another object of the present invention to provide a molded article which provides higher chemical resistance with respect to a blowing agent, particularly a recently-developed eco-friendly blowing agent, while providing the same impact strength, gloss, and vacuum moldability as existing resin compositions when used to produce an inner case of a refrigerator.

The above and other objects can be accomplished by the present disclosure described below.

Technical Solution

In accordance with one aspect of the present invention, provided is a thermoplastic resin composition, including: 100 parts by weight of a base resin that includes greater than 0% by weight to 35% by weight of a diene-based graft copolymer, greater than 0% by weight to 30% by weight of an acrylic graft copolymer, and 35 to 85% by weight of a copolymer of a vinyl cyanide compound and an aromatic vinyl compound; and
greater than 1 part by weight of a polyester-based elastomer having a melt index of 0.1 to 10 g/10 min (230° C., 2.16 kg).

In accordance with another aspect of the present invention, there is provided a molded article including the thermoplastic resin composition.

Advantageous Effects

As apparent from the fore-going, the present invention advantageously provides a thermoplastic resin composition providing higher chemical resistance with respect to a blowing agent while providing the same impact strength, gloss, and vacuum moldability as existing resin compositions when used to produce an inner case of a refrigerator, and a molded article manufactured from the same.

BEST MODE

Hereinafter, the present invention is described in detail.

The present inventors confirmed that, when a foam sheet made of a blowing agent having an Ozone Depletion Potential (ODP) of 0 is mixed with, other than a diene-based rubber, an acrylic rubber and includes a specific polyester-based elastomer to apply the foam sheet to a base of an inner case, a more stringent level of chemical resistance is accomplished and the same impact strength, gloss, and vacuum moldability as those of exhibiting cases are provided, thus completing the present invention.

Hereinafter, the thermoplastic resin composition according to the present invention is described in detail.

The thermoplastic resin composition according to the present invention includes 100 parts by weight of a base resin that includes greater than 0% by weight to 35% by weight of a diene-based graft copolymer, greater than 0% by weight to 30% by weight of an acrylic graft copolymer, and 35 to 85% by weight of a copolymer of a vinyl cyanide compound and an aromatic vinyl compound; and greater than 1 part by weight of a polyester-based elastomer having a melt index of 0.1 to 10 g/10 min (230° C., 2.16 kg).

The diene-based graft copolymer may be, for example, a copolymer prepared by graft polymerizing 30 to 70% by weight of a diene-based rubbery polymer; and 30 to 70% by weight of the sum of an aromatic vinyl compound and a vinyl cyanide compound. Within these ranges, impact strength, gloss, and vacuum moldability are improved without affecting chemical resistance.

As another example, the diene-based graft copolymer may be a copolymer prepared by graft polymerizing 35 to 65% by weight of a diene-based rubbery polymer; and 35 to 65% by weight of the sum of an aromatic vinyl compound and a vinyl cyanide compound.

The vinyl cyanide compound of the aromatic vinyl compound and the vinyl cyanide compound (hereinafter referred to as "compounds") may be included, for example, in an amount of 20 to 40% by weight, or 25 to 35% by weight based on 100% by weight of a total of the compounds. Within this range, impact strength, gloss, vacuum moldability, and chemical resistance are improved.

The aromatic vinyl compound of the present disclosure may be, for example, one or more selected from the group consisting of styrene, α-methylstyrene, o-ethylstyrene, p-ethylstyrene, and vinyltoluene.

The vinyl cyanide compound of the present disclosure may be, for example, one or more selected from the group consisting of acrylonitrile, methacrylonitrile, and ethacrylonitrile.

The diene-based rubbery polymer may have, for example, an average particle diameter of 0.2 to 0.4 μm. Preferably, the diene-based rubbery polymer has an average particle diameter of 0.25 to 0.35 μm. In this case, impact strength, gloss, vacuum moldability, and chemical resistance are improved.

The diene-based rubbery polymer may be prepared, for example, by polymerizing a conjugated diene compound. The conjugated diene compound may be, for example, one or more selected from the group consisting of 1,3-butadiene, 2,3-dimethyl-1,3-butadiene, 2-ethyl-1,3-butadiene, 1,3-pentadiene, and isoprene. Preferably, the diene-based rubbery polymer is 1,3-butadiene.

The diene-based graft copolymer may be included, for example, in an amount of 5 to 35% by weight, or 10 to 35% by weight based on 100% by weight of the base resin. Within this range, impact strength, gloss, and vacuum moldability are improved without affecting chemical resistance.

The acrylic graft copolymer may be, for example, a copolymer prepared by graft polymerizing 30 to 70% by weight of an acrylic rubbery polymer; and 30 to 70% by weight of the sum of the aromatic vinyl compound and the vinyl cyanide compound. Within this range, chemical resistance is improved without affecting impact strength, gloss, and vacuum moldability.

Preferably, the acrylic graft copolymer is a copolymer prepared by graft polymerizing 35 to 65% by weight of an acrylic rubbery polymer; and 35 to 65% by weight of the sum of the aromatic vinyl compound and the vinyl cyanide compound.

The vinyl cyanide compound of the aromatic vinyl compound and the vinyl cyanide compound (hereinafter referred to as "compounds") may be included, for example, in an amount of 20 to 40% by weight, or 25 to 35% by weight based on 100% by weight of a total of the compounds. Within this range, impact strength, gloss, vacuum moldability, and chemical resistance are improved.

The acrylic rubbery polymer may have, for example, an average particle diameter of 0.3 to 0.6 μm. Preferably, the acrylic rubbery polymer has an average particle diameter of 0.35 to 0.55 μm. In this case, impact strength, gloss, vacuum moldability, and chemical resistance are effectively improved.

The acrylic rubbery polymer may be formed, for example, by polymerizing an acrylate monomer. The acrylate monomer may be, for example, an alkyl acrylate having 2 to 8 carbon atoms. As a particular example, the acrylate monomer may be one or more selected from the group consisting of methyl acrylate, ethyl acrylate, propyl acrylate, isopropyl acrylate, t-butyl acrylate, n-butyl acrylate, n-octyl acrylate, 2-ethylhexyl acrylate, methyl methacrylate, ethyl methacrylate, propyl methacrylate, isopropyl methacrylate, t-butyl methacrylate, n-butyl methacrylate, n-octyl methacrylate, and 2-ethylhexyl methacrylate. Preferably, the acrylate monomer is n-butyl acrylate or n-butyl methacrylate.

The acrylic graft copolymer may be included, for example, in an amount of 5 to 30% by weight, or 5 to 20% by weight based on 100% by weight of the base resin. Within this range, chemical resistance is improved without affecting impact strength, vacuum moldability, and gloss.

The copolymer of the vinyl cyanide compound and the aromatic vinyl compound may be, for example, a copolymer prepared by polymerizing 55 to 95% by weight of an aromatic vinyl compound and 5 to 45% by weight of a vinyl cyanide compound. Within this range, moldability required to process into a matrix resin, and chemical resistance and stiffness necessary for application to a product may be provided.

As another example, the copolymer of the vinyl cyanide compound and the aromatic vinyl compound may be a copolymer prepared by polymerizing 60 to 90% by weight of an aromatic vinyl compound and 10 to 40% by weight of a vinyl cyanide compound.

The copolymer of the vinyl cyanide compound and the aromatic vinyl compound may be, for example, a bulk polymer, an emulsion polymer, or a suspension polymer.

The vinyl cyanide compound-aromatic vinyl compound copolymer may be included, for example, in an amount of 35 to 85% by weight, or 38 to 80% by weight based on 100% by weight of the base resin. Within this range, chemical resistance may be improved without affecting impact strength and gloss.

The polyester-based elastomer may be prepared, without being limited to, by solid-state polymerizing a resin that is prepared by melt polymerizing an aromatic dicarboxylic acid or an ester-forming derivative thereof, an aliphatic diol, and a polyalkylene oxide. In this case, the polyester-based elastomer may have a Shore hardness of 35 to 55D, or 40 to 50D and a melt index (MI) of 0.1 g/10 min to 10 g/10 min, or 1 g/10 min to 10 g/10 min. Here, the weight (g) is measured at 230° C. under a load of 2.16 kg for 10 minutes according to ASTM D1238. Within these ranges, chemical resistance is improved without affecting extrusion processing and vacuum moldability.

The aromatic dicarboxylic acid may be, for example, one or more selected from the group consisting of terephthalic acid, isophthalic acid, 2,6-naphthalene dicarboxylic acid, 1,5-naphthalene dicarboxylic acid, and 1,4-cyclohexane dicarboxylic acid.

The ester-forming derivative of the aromatic dicarboxylic acid may be, for example, one or more selected from the group consisting of dimethyl terephthalate, dimethyl isophthalate, 2,6-dimethyl naphthalene dicarboxylate, and dimethyl 1,4-cyclohexane dicarboxylate. Preferably, the ester-forming derivative is dimethyl terephthalate.

The aromatic dicarboxylic acid or the ester-forming derivative thereof may be included, for example, in an amount of 25 to 65% by weight based on a total weight of the polyester-based elastomer. The aromatic dicarboxylic acid or the ester-forming derivative thereof is preferably included in an amount of 35 to 65% by weight based on a total weight of the polyester-based elastomer. Within this range, superior reaction balance is exhibited, whereby reaction smoothly proceeds.

The aliphatic diol may have a molecular weight of 300 g/mol or less. As a particular example, the aliphatic diol may be one or more selected from the group consisting of ethylene glycol, propylene glycol, 1,2-propanediol, 1,3-propanediol, 1,4-butanediol, 1,5-pentanediol, 1,6-hexanediol, 1,4-cyclohexanedimethanol, and the like. Preferably, the aliphatic diol may be 1,4-butanediol. The aliphatic diol may be included in an amount of 20 to 40% by weight based on a total weight of the thermoplastic polyester elastomer. Preferably, the aliphatic diol may be included in an amount of 2 to 35% by weight based on a total weight of the thermoplastic polyester elastomer. Within this range, superior reaction balance is exhibited, whereby reaction smoothly proceeds.

The polyalkylene oxide may constitute, for example, a soft segment in the form of aliphatic polyether. As a particular example, the polyalkylene oxide may be one or more selected from the group consisting of a copolymer of polyethylene glycol, polypropylene glycol, polytetramethylene glycol, polyhexamethylene glycol, ethylene oxide, and propylene oxide, an ethylene oxide-added polymer of polypropylene glycol, a copolymer of ethylene oxide and tetrahydrofuran, and the like. Preferably, the polyalkylene oxide is polytetramethylene glycol.

The polyalkylene oxide may be included, for example, in an amount of 10 to 50% by weight based on a total weight of the thermoplastic polyester-based elastomer. Preferably, the polyalkylene oxide is included in an amount of 15 to 45% by weight based on a total weight of the thermoplastic polyester-based elastomer. When the polyalkylene oxide is included in an amount of less than 10% by weight, the hardness of a prepared thermoplastic polyester-based elastomer is too high, whereby flexibility is not satisfactory. When the polyalkylene oxide is included in an amount of greater than 50% by weight, heat resistance, compatibility, and the like of a prepared thermoplastic polyester-based elastomer are not satisfactory.

The polytetramethylene glycol has a number average molecular weight of preferably 600 to 3,000 g/mol, more preferably about 2,000 g/mol. Within this range, stable polymerization and properties of a polymerization copolymer are obtained.

For reference, the hardness of the elastomer is generally represented as Shore hardness (Shore D) and may be determined according to the content of the polyalkylene oxide.

When the elastomer is prepared through polymerization, a branching agent, etc. may be used. When a branching agent is used, the melt viscosity and melt tension of a prepared elastomer may increase.

The branching agent may be, for example, one or more selected from the group consisting of glycerol, pentaerythritol, trimellitic anhydride, trimellitic acid, trimethylol propane, and neopentyl glycol. Preferably, the branching agent is trimellitic anhydride. The branching agent may be included, for example, in an amount of 0.05 to 0.1% by weight based on a total weight of the thermoplastic polyester-based elastomer. When the branching agent is included in an amount of less than 0.05% by weight, it is difficult to anticipate increase in melt viscosity of a prepared elastomer. When the branching agent is included in an amount of greater than 0.1% by weight, a polymerization degree of a prepared elastomer excessively increases, whereby it may be difficult to control melt polymerization and to discharge a generated resin.

The melt polymerization is not specifically limited so long as it is general melt polymerization used to prepare a thermoplastic polyester-based elastomer. As a particular example, a catalyst, titanium butoxide, is added to a start material composed of an aromatic dicarboxylic acid, an aliphatic diol, and a polyalkylene oxide, and then transesterification is performed at 140 to 215° C. for about 120 minutes, thereby preparing a bis(4-hydroxy butyl) terephthalate (BHBT) oligomer. The prepared BHBT oligomer is added to a catalyst, titanium butoxide, again, and then condensation polymerization is performed (for about 120 minutes) until a melt index (MFI) reaches 20 g/10 min (230° C., 2.16 kg) according to ASTM D1238 while reducing pressure stepwise from 760 torr down to 0.3 torr at 215 to 245° C. Subsequently, a product generated in a reactor is discharged using pressurized nitrogen, followed by pelletizing the same. Finally, a pellet-type thermoplastic polyester elastomer is prepared.

The solid-state polymerization is characterized by feeding the thermoplastic polyester-based elastomer, which is prepared by melt polymerization, into a solid-state polymerization reactor, and then polymerizing for 10 to 24 hours until a melt index (MFI) reaches 15 g/10 min (230° C., 2.16 kg) or less, preferably 10 g/10 min (230° C., 2.16 kg) or less, according to ASTM D1238 while gradually reducing pressure at about 140 to 200° C. under high vacuum in an inert gas stream. Through such solid-state polymerization, a high-viscosity thermoplastic polyester-based elastomer may be prepared.

The solid-state polymerization reactor may be a vacuum vessel drier including a high-vacuum rotatable pump connected thereto, or the like. The inert gas stream may be a nitrogen gas stream, or the like.

The polyalkylene oxide may be, for example, poly(tetramethylene ether)glycol, or poly(tetramethylene ether)glycol having a molecular weight of 600 to 3,000 g/mol, or polypropylene glycol, a terminal of which is capped with ethylene oxide. Preferably, the polyalkylene oxide has a molecular weight of 2,000 to 3,000 g/mol. Within this range, proper polymerization reactivity and properties may be anticipated.

The polyester-based elastomer used in the present disclosure may be, for example, commercially available KEYFLEX BT 2140D (DSC melting point: 198° C., Shore A hardness: 95, Shore D hardness: 43, manufactured by LG Chemistry), or the like.

The polyester-based elastomer may be included, for example, in an amount of greater than 1 part by weight, greater than 1 part by weight to 20 parts by weight, 1 to 10 parts by weight, or 3 to 10 parts by weight based on 100 parts by weight of the base resin. Within this range, the chemical resistance of a blowing agent, particularly an eco-friendly blowing agent, is improved and surface gloss, impact strength, and vacuum moldability are maintained.

The thermoplastic resin composition may further include, for example, one or more selected from the group consisting of an antimicrobial agent, a heat stabilizer, an antioxidant, a releasing agent, a light stabilizer, an inorganic additive, a surfactant, a coupling agent, a plasticizer, a compatibilizer, a lubricant, an antistatic agent, a coloring agent, a pigment, a dye, a flame retardant, a flame retardant aid, an antidripping agent, a weathering agent, an ultraviolet absorber, and a sunscreen.

The thermoplastic resin composition of the present disclosure may be used, for example, as a base of a polyurethane foam sheet. Here, the polyurethane foam sheet may be, for example, a sheet foamed only using a blowing agent that includes a fluoroalkene compound with 2 to 6 carbon atoms and has a Global Warming Potential (GWP) of less than 7 and an Ozone Depletion Potential (ODP) of 0, or using a mixture including the blowing agent. Here, the mixture of the blowing agent may be 141b, 245fa, cyclopentene, or the like.

As another example, the blowing agent may include a fluoroalkene compound having 3 to 5 carbon atoms. Preferably, the blowing agent includes a compound represented by Formula 1 below:

$$XCF_2R_{3-z}$$ [Equation 1]

wherein X is a $C_1$, $C_2$, $C_3$, $C_4$ or $C_5$ unsaturated, substituted or unsubstituted radical, R is each independently Cl, F, Br, or H, and z is 1 to 3.

For example, the compound represented by Formula 1 may have at least four halogen substituents. At least three of these substituents may be F.

As another example, the compound represented by Formula 1 has three to five fluoro substituents. The compound may have substituents such as propene, butene, pentene, and hexene.

As another example, the propene is preferably tetrafluoropropene or fluorochloropropene, more preferably $CF_3CH=CHCl$ (HFO-1233zd) or $CF_3CH=CHF$ (HFO-1234ze).

The expressions "HFO-1233zd" and "HFO-1234ze" are respectively used to indicate 1-chloro-3,3,3-trifluoropropene and 1,3,3,3,-tetrafluoropropene without regard to cis or trans form. Accordingly, the expression "HFO-1233zd" indicates cis-HFO-1233zd, trans-HFO-1233zd, and all combinations thereof, and the expression "HFO-1234ze" indicates cis-HFO-1234ze, trans-HFO-1234ze, and all combinations thereof.

For example, HFO-1233zd is a liquid foaming agent having a Global Warming Potential (GWP) of less than 7, an Ozone Depletion Potential (ODP) of about 0, an atmospheric lifespan of about 26 days, and a boiling point of about 19° C., and HFO-1234ze is a gaseous foaming agent having a Global Warming Potential (GWP) of less than 6, an Ozone Depletion Potential (ODP) of 0, an atmospheric lifespan of about 14 days, and a boiling point of about −19° C.

As another example, the butene is preferably fluorochlorobutene.

The blowing agent of the present disclosure may further include HFCs, a blowing agent, having one to four carbon atoms, as needed. The blowing agent HFCs may be, for example, one or more selected from the group consisting of difluoromethane (HFC-32), fluoroethane (HFC-161), difluoroethane (HFC-152), trifluoroethane (HFC-143), tetrafluoroethane (HFC-134), pentafluoroethane (HFC-125), pentafluoropropane (HFC-245), hexafluoropropane (HFC-236), heptafluoropropane (HFC-227ea), pentafluorobutane (HFC-365), hexafluorobutane (HFC-356), and isomers thereof.

After immersing the thermoplastic resin composition of the present disclosure, for example, in a blowing agent, which includes a fluoroalkene compound with 2 to 6 carbon atoms and having a Global Warming Potential (GWP) of 1 and an Ozone Depletion Potential (ODP) of about 0, at −40° C. for 20 hr, the thermoplastic resin composition may exhibit a surface crack generation rate of 0%.

The thermoplastic resin composition of the present disclosure may have, for example, an Izod impact strength (ASTM D256) of greater than 20 kgf·cm/cm, or greater than 20 kgf·cm/cm to 40 kgf·cm/cm.

The thermoplastic resin composition of the present disclosure may have, for example, a high-temperature tensile strength, as an index of vacuum moldability, (measured at 150° C.) of greater than 4.5 $kgf/cm^2$, or greater than 4.5 $kgf/cm^2$ to 5.0 $kgf/cm^2$.

For example, raw materials of the thermoplastic resin composition are primarily mixed in a mixer or a super mixer, and then fed into any one of mixing processors such as a twin-screw extruder, a single-screw extruder, a roll mill, and a kneader. Alternatively, the raw materials are fed, in a predetermined addition ratio, into any one of mixers such as a twin-screw extruder and a kneader. Subsequently, melt kneading is performed at 200 to 300° C., thereby providing an extrusion-molded article having a desired shape or obtaining a pellet. The obtained pellet is fed into an extrusion-molding machine again to produce an extrusion-molded article. As needed, the pellet may be subjected to dehumidification drying or hot air drying and then injection molding. As a result, an injection-molded article may be provided.

In accordance with the present invention, a molded article including the aforementioned thermoplastic resin composition is provided.

The molded article may be an extruded sheet. For example, the molded article may be usefully used in various fields, such as an extruded sheet for refrigerator inner cases, a sheet for refrigerator doors, and a sheet for general doors, in which a molded article is processed into a sheet form.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Examples 1 to 3 and Comparative Examples 1 to 4

Ingredients summarized in Table 1 below were fed into a super mixer in amounts disclosed in the table, and melt-kneaded at 230° C. by means of a twin-screw extruder, followed by extrusion processing. As a result, a pellet was obtained. This pellet was used as a specimen for measuring properties.

Substances Summarized in Table 1 Below (A) Butadiene-based graft copolymer: Average particle diameter of 0.2 to 0.4 μm (product name: DP270, manufactured by LG Chemistry)

(B) Acrylic graft copolymer: Average particle diameter of 0.3 to 0.6 μm (product name: SA927, manufactured by LG Chemistry)

(C) Vinyl cyanide-aromatic vinyl based copolymer (SAN resin): 97HC (manufactured by LG Chemistry)

(D) Polyester-based elastomer (thermoplastic polyester elastomer):

(D1) KEYFLEX BT 2140D (manufactured by LG Chemistry): MI: 5 g/10 min (230° C., 2.16 kg), Shore A hardness: 95, Shore D hardness: 43

(D2) KEYFLEX BT 1045D (manufactured by LG Chemistry): MI: 25 g/10 min (230° C., 2.16 kg), Shore A hardness: 95, Shore D hardness: 42

The average particle diameter was measured by means of a Nicomp370HPL according to a dynamic laser light scattering method.

Test Examples

The properties of the specimen obtained according to each of Examples 1 to 3 and Comparative Examples 1 to 4 were measured by the following methods. Results are summarized in Table 1 below.

Property Measurement Methods

<Chemical Resistance Test-Measurement of Change in ESCR>

Each of the obtained specimens was injection-molded to manufacture a specimen for property measurement. This injection-molded specimen was placed on a bending jig with 0.7% strain and immersed in a blowing agent solution, HFO-1233zd (product name: Solstice LBA), manufactured by Honeywell. After 20 hr at −40° C., crack generation on a surface was observed with the naked eye.

<Izod Impact Strength>

Each of the obtained specimens was injection-molded to manufacture a specimen (thickness: ¼") for Izod impact strength measurement. The Izod impact strength of the manufactured specimen was measured according to ASTM D256.

<Surface Gloss>

Each of the obtained specimens was molded in a sheet shape at 230° C. by means of a single-screw extruder to which a T-die was connected. The surface gloss of a resultant specimen was measured at an angle of 60 according to ASTM D2457.

<Melt Index>

The melt index of a polyester-based elastomer was measured at 230° C. under a load of 2.16 kg according to ASTM D1238. The melt index was represented as the weight (g) of a polymer melted over 10 minutes.

<High-Temperature Tensile Strength>

Each of the obtained specimens was injection-molded into a size of 100 mm×100 mm×3.2 mm. This injection-molded specimen was cut into a size having a total length of 51 mm, a total width of 15 mm, and a measured part width of 6.5 mm. The high-temperature tensile strength of a cut specimen was measured at a rate of 200 ram/min after maintaining the cut specimen at 150° C. for 15 minutes. Here, high tensile strength indicates superior vacuum moldability.

TABLE 1

| Classification | Example 1 | Example 2 | Example 3 | Comparative Example 1 | Comparative Example 2 | Comparative Example 3 | Comparative Example 4 |
|---|---|---|---|---|---|---|---|
| (A)* | 20 | 20 | 20 | 20 | 30 | 0 | 20 |
| (B)* | 10 | 10 | 20 | 10 | 0 | 30 | 10 |
| (C)* | 70 | 70 | 60 | 70 | 70 | 70 | 70 |
| (D1)** | 5 | 10 | 5 | 0 | 5 | 5 | 0 |
| (D2)** | 0 | 0 | 0 | 0 | 0 | 0 | 5 |
| ESCR | No crack | No crack | No crack | Crack | Crack | No crack | No crack |
| Surface gloss (60°) | 94 | 92 | 92 | 94 | 94 | 89 | 87 |
| Izod impact strength (kgf · cm/cm) | 30 | 32 | 35 | 29 | 32 | 20 | 27 |

TABLE 1-continued

| Classification | Example 1 | Example 2 | Example 3 | Comparative Example 1 | Comparative Example 2 | Comparative Example 3 | Comparative Example 4 |
|---|---|---|---|---|---|---|---|
| High-temperature tensile strength (kgf/cm$^2$) | 4.6 | 4.8 | 4.9 | 4.5 | 4.3 | 4.9 | 3.8 |

**parts by weight based on 100 parts by weight of the sum of three copolymers designated by *.

As shown in Table 1, it can be confirmed that, in the cases of Examples 1 to 3 according to the present invention, the molded articles obtained from the thermoplastic resin composition provide higher chemical resistance to an eco-friendly blowing agent while providing impact strength, gloss, and vacuum moldability identical to those of existing resin compositions, when used to produce an inner case of a refrigerator.

On the other hand, it can be confirmed that, in the cases of Comparative Examples 1 to 4, gloss, impact strength, and vacuum moldability are poor.

Additional Experimental Example 1

A process was carried out in the same manner as in Example 1, except that the polyester elastomer (D) was used in an amount of 20 parts by weight.

As chemical resistance-ESCR change measurement results, a surface crack generation rate was 0% (no crack), a surface gloss (at 60 degrees) was 75, an Izod impact strength was 33 kgf·cm/cm, and a high-temperature tensile strength was 4.9 kgf/cm$^2$. Accordingly, it can be confirmed that surface gloss thereof is poor compared to Examples 1 to 3.

From these results, the present inventors confirmed that, when a foam sheet made of a blowing agent having an Ozone Depletion Potential (ODP) of 0 is mixed with, other than a diene-based rubber, an acrylic rubber and includes a specific polyester-based elastomer to apply the foam sheet to a base of an inner case, a thermoplastic resin composition accomplishing a more stringent level of chemical resistance and providing the same impact strength, gloss, and vacuum moldability as those of an exhibiting composition may be realized.

The invention claimed is:

1. A thermoplastic resin composition, comprising:
   100 parts by weight of a base resin that comprises greater than 0% by weight to 35% by weight of a diene-based graft copolymer, greater than 0% by weight to 30% by weight of an acrylic graft copolymer, and 35 to 85% by weight of a copolymer of a vinyl cyanide compound and an aromatic vinyl compound; and
   greater than 1 part by weight of a polyester-based elastomer having a melt index of 0.1 to 10 g/10 min (230° C., 2.16 kg).

2. The thermoplastic resin composition according to claim 1, wherein the diene-based graft copolymer is a copolymer prepared by graft polymerizing 30 to 70% by weight of a diene-based rubbery polymer; and 30 to 70% by weight of a sum of an aromatic vinyl compound and a vinyl cyanide compound,
   wherein the vinyl cyanide compound is comprised in an amount of 20 to 40% by weight based on 100% by weight of a total of the compounds.

3. The thermoplastic resin composition according to claim 2, wherein the diene-based rubbery polymer has an average particle diameter of 0.2 to 0.4 μm.

4. The thermoplastic resin composition according to claim 1, wherein the acrylic graft copolymer is a copolymer prepared by graft polymerizing 30 to 70% by weight of an acrylic rubbery polymer; and 30 to 70% by weight of a sum of the aromatic vinyl compound and the vinyl cyanide compound,
   wherein the vinyl cyanide compound is comprised in an amount of 20 to 40% by weight based on 100% by weight of a total of the compounds.

5. The thermoplastic resin composition according to claim 4, wherein the acrylic graft copolymer has an average particle diameter of 0.3 to 0.6 μm.

6. The thermoplastic resin composition according to claim 1, wherein the acrylic graft copolymer is comprised in an amount of 5 to 30% by weight based on 100% by weight of the base resin.

7. The thermoplastic resin composition according to claim 1, wherein the copolymer of the vinyl cyanide compound and the aromatic vinyl compound is a copolymer prepared by polymerizing 55 to 95% by weight of an aromatic vinyl compound and 5 to 45% by weight of a vinyl cyanide compound.

8. The thermoplastic resin composition according to claim 1, wherein the polyester-based elastomer is prepared by solid-state polymerizing a resin that is prepared by melt polymerizing aromatic dicarboxylic acid or an ester-forming derivative thereof, aliphatic diol, and polyalkylene oxide.

9. The thermoplastic resin composition according to claim 1, wherein the polyester-based elastomer has a Shore D hardness of 35 to 55.

10. The thermoplastic resin composition according to claim 1, wherein the polyester-based elastomer is comprised in an amount of greater than 1 part by weight to 20 parts by weight based on 100 parts by weight of the base resin.

11. The thermoplastic resin composition according to claim 1, wherein the thermoplastic resin composition is used as a base of a polyurethane foam sheet.

12. The thermoplastic resin composition according to claim 11, wherein the polyurethane foam sheet is a polyurethane sheet foamed with a blowing agent that comprise a fluoroalkene compound having 2 to 6 carbon atoms and has a Global Warming Potential (GWP) of less than 7.

13. The thermoplastic resin composition according to claim 1, wherein, after immersing the thermoplastic resin composition in a blowing agent, which comprise a fluoroalkene compound having 2 to 6 carbon atoms and has a Global Warming Potential (GWP) of less than 7, at −40° C. for 20 hr, the thermoplastic resin composition exhibits a surface crack generation rate of 0%.

14. The thermoplastic resin composition according to claim 1, wherein the thermoplastic resin composition has an Izod impact strength of greater than 20 kgf.cm/cm.

15. The thermoplastic resin composition according to claim 1, wherein the thermoplastic resin composition has a high-temperature tensile strength of greater than 4.5 kgf/cm$^2$ (measured at 150° C.).

16. A molded article comprising the thermoplastic resin composition according to claim 1.

17. The molded article according to claim 16, wherein the molded article is an extruded sheet for an inner case.

* * * * *